May 23, 1967 N. V. MANSUETTO ETAL 3,321,745

SEMICONDUCTOR BLOCK HAVING FOUR LAYER DIODES IN MATRIX ARRAY

Filed Nov. 20, 1963 3 Sheets-Sheet 1

INVENTOR.
N.V. MANSUETTO
R.F. BERRY
BY
ATTORNEY

United States Patent Office 3,321,745
Patented May 23, 1967

3,321,745

SEMICONDUCTOR BLOCK HAVING FOUR LAYER DIODES IN MATRIX ARRAY

Nicholas Victor Mansuetto, Lisle, and Raymond F. Berry, Hazel Crest, Ill., assignors to International Telephone and Telegraph Corporation Filed Nov. 20, 1963, Ser. No. 325,074
12 Claims. (Cl. 340—166)

ABSTRACT OF THE DISCLOSURE

A switch for an electronic switching system uses crosspoints in the form of PNPN diodes diffused into an integrated block of semiconductor material. Electrical conductors are bonded to the semiconductor material in a manner which provides a monolithic matrix of a type similar to that shown for discrete elements in U.S. Patent 3,204,044.

This invention relates to electronic switching networks and more particularly to switching arrangements which are functionally similar to electro-mechanical devices of the variety used in crossbar telephone exchanges.

Exchanges of the type described herein are capable of extending connections through a network of crosspoints. To minimize the number of crosspoints required for completing many simultaneous connections, these exchanges usually comprise a series of cascaded matrices. Input conductors, such as subscriber lines, are connected to the first in the cascaded series (often called the "primary matrix"). Output conductors, such as control links, are connected to the last in the cascaded series (often called a "secondary matrix"). Thus, at least one primary and one secondary matrix are required to complete each connection through an exchange. Of course, this primary-secondary network is only an exemplary one of many arrangements which are known to those skilled in the art.

In the past, either crossbar switches or electronic components have been wired together to provide the various stages of the crosspoint network. Of these, the crossbar switches are generally manufactured as complete units of standard sizes having their own control components, such as select or hold magnets, for example. Therefore, each system using crossbar switches requires a certain minimum number of switches, and these switches may contain unused capacity. Thus, crossbar exchanges are not necessarily economical in the use of either crosspoints or components for controlling the crosspoints. Networks of electronic crosspoints have proven to be more economical than crossbar switches in the use of both crosspoints and control components because the networks do not come in standard sizes, but are assembled in any convenient size. However, a conventional network of electronic components requires many soldered connections and much hand labor. Thus, much of the theoretical savings is lost during assembly.

Recent developments in the semiconductor field suggest that a number of crosspoint switches may be combined in one semiconductor device, thus eliminating many of the expensive solder and hand operations while retaining the advantages of electronic crosspoints. Moreover, these semiconductor devices may be made small enough so that virtually no unused switching capacity is required merely because an irreducible number of switches are required.

Accordingly, an object of this invention is to provide new and improved switching arrangements. Here an object is to provide automatic electronic switching arrangements wherein both the crosspoint controls and the required number of crosspoints are minimized. In particular, an object is to provide new and improved self-seeking, current controlled, solid-state switching networks.

Another object of this invention is to provide primary-secondary crosspoint switch arrangements using integrated semiconductor devices. A related object is to provide electronic crossbar-type switching arrangements wherein input conductors and output conductors are connected directly to a plurality of parallel sections in an integrated block of semiconductor material.

A further object of this invention is to provide automatic telephone exchanges using electronic switching arrangements for interconnecting subscriber lines and control circuits via a minimum number of crosspoints with virtually no individual crosspoint control components.

In accordance with one aspect of this invention, a switching network is provided for extending a plurality of simultaneous connections via groups of integrated semiconductor devices. Each integrated device comprises a strip of semiconductor material, having a plurality of four layer diode sections formed therein (the term "four layer" is intended to cover both PNPN and NPNP configurations). These strips are supported in spaced parallel relation with the diode sections oriented to provide a number of successive horizontal multiples. Then all of the horizontally disposed diodes which form each individual horizontal multiple are joined electrically. This provides a switching array of intersecting vertical (the strips) and horizontal (the joined diodes) multiples with a four layer diode connected across each intersection. Thus, any one of the vertical multiples may be connected with any one of the horizontal multiples if a crosspoint common to each multiple is fired. These switching arrays are interconnected to provide primary and secondary switching stages connecting into a single, unitary switching network.

The above mentioned and other objects and features of this invention and the manner of obtaining them will become more apparent, and the invention itself will be best understood by reference to the following description of an embodiment of the invention taken in conjunction with the accompanying drawings in which.

Figure 1:
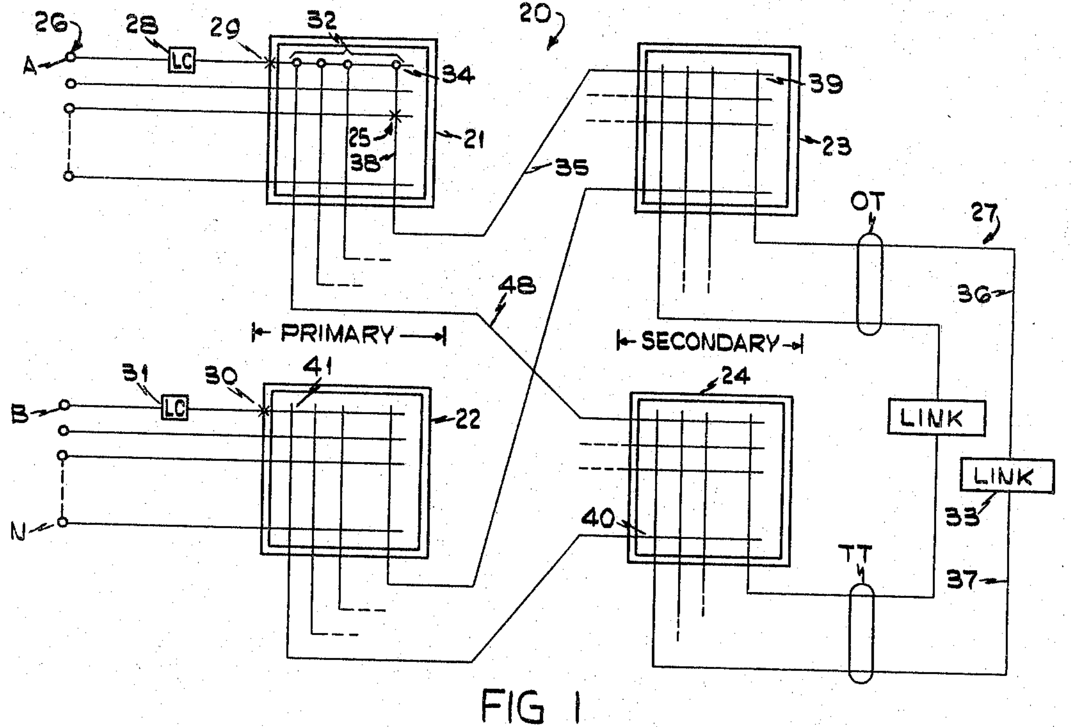
FIG. 1 is a block diagram showing an exemplary switching exchange utilizing the invention.

Here a block diagram (FIG. 1) shows an exemplary telephone system utilizing a network 20 of electronic crosspoints. These crosspoints are distributed over two cascaded stages of four matrices 21–24, each matrix electronically performing functions somewhat as a crossbar switch performs its functions. By way of identification, an exemplary one of the crosspoints is marked 25; the first cascaded stage is marked "primary" and the second cascaded stage is marked "secondary." The matrices are inter-connected in any suitable switching pattern with one exemplary pattern here shown as a well known primary-secondary spread. Thus, each matrix is constructed as a unitary device, and every crosspoint has access to at least one input to the next cascaded stage of switching equipment.

First equipments, called "lines," 26 are connected to one side of the network 20, and second equipments, called "links," 27 are connected to the other side of the network 20. The purpose of the network is to selectively connect any line to any link. Each line may, for example, extend from a telephone subscriber station to the network 20 via an individually associated line circuit such as 28. Thus, the subscriber line A is here shown as connected to a network access point 29 via the individually associated line circuit 28. In like manner, line B may be any other suitable device connected to a network access point 30 via another line circuit 31. The letter "N" indicates that any number of similar lines may also be so connected.

Each of the control equipments 27 may take any suitable form; however, the invention contemplates the use of link circuits of types which are well known in automatic telephony. For example, one suitable automatic telephone system showing such links appears in U.S. Patent 3,204,044, entitled "Electronic Switching Telephone System," granted on Aug. 3, 1965 to Virgle E. Porter and assigned to the assignee of this application. In general, each link is a one-way device for extending connections from an originating trunk (OT) to a terminating trunk (TT). The various links are connected to the various switches (and to any other suitable equipment, such as registers) for processing a network connection, in any manner known to those skilled in the art.

The (FIG. 1) system operates this way. A calling line (such as the one connected to station A) requests service, as when a subscriber removes a receiver or handset. Responsive thereto, line circuit 28 places a demand on the switching network 20 as, for example, by applying an end-marking to access point 29. This marking causes any available one of the crosspoints in the horizontal multiple 32 to complete a circuit to an idle and available originate trunk OT via a secondary matrix, such as 23.

In this particular call, it may be assumed that the matrices respond to the end-marking applied from line circuit 28 by connecting station A to link 33 via crosspoint 34, conductor 35, matrix 23, crosspoint 39, and an originate trunk 36. Link 33 returns dial tone to station A, and the calling subscriber dials a wanted number. Then, the link 33 marks the line circuit of the called line and the terminate trunk 37. If, for example, a subscriber at station A dials the directory number of subscriber station B, this marking appears at access point 30 at a time when link 33 marks the terminate trunk 37.

A path now finds its way from the called line through matrices 22, 24 to the marked terminate trunk 37 just as the path from calling line A found its way through the network to the previously marked originate trunk 36. The link 33 transmits a ringing current to subscriber station B, receives answer supervision, and then holds the connection for the duration of the call. After both paths are completed, link 33 closes a voice gate between them.

Now the subscribers may talk to each other over a connection traced from access point 29 through horizontal multiple 32, crosspoint 34, vertical multiple 38, interstage wiring 35, matrix 23, crosspoint 39, originate trunk 36, link 33, terminate trunk 37, crosspoint 40 of matrix 24, crosspoint 41 of matrix 22, access point 30, and line circuit 31 to subscriber station B. After the call is over and the subscribers hang-up, either the line circuits 28, 31 or the link 33 releases the connection and the circuit returns to normal.

Figure 2:
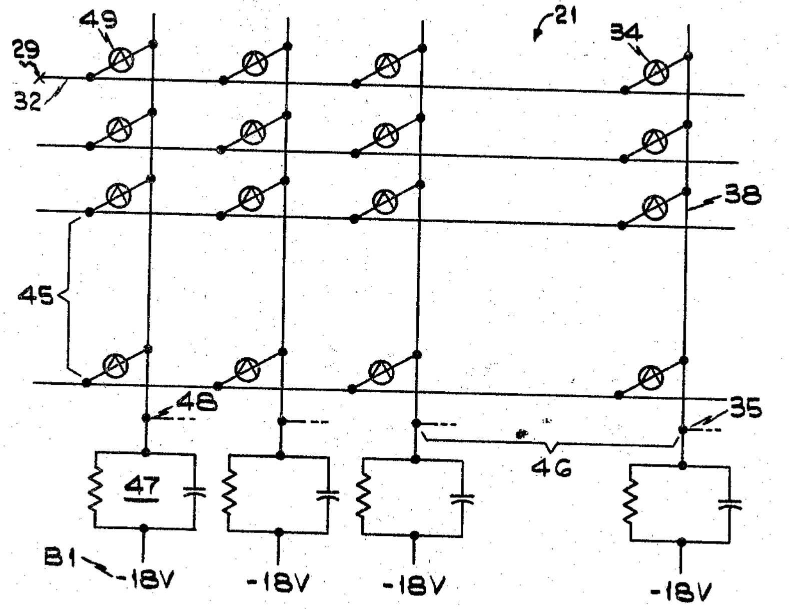
FIG. 2 is a schematic circuit for an electrical matrix used in the network of FIG. 1.

The foregoing is a system description of how the above identified Porter system operates. FIG. 2 shows additional details of the matrix which FIG. 1 broadly shows by means of the boxes 21, 22. This matrix comprises a plurality of horizontal and vertical multiples arranged in intersecting relation to provide an array of crosspoints. For example, horizontal multiple 32 intersects with vertical multiple 38 at crosspoint 34. Here we show four horizontal and four vertical multiples; the brackets 45, 46 indicate that any number of similar multiples may also be provided.

An electronic switch means is connected across the multiples at each intersection. For example, the crosspoint 34 is a four layer diode which switches "off" to assume a high resistance state and electrically isolate the multiples 32, 38. If a potential (exceeding a "firing potential") is applied across the multiples 32, 38, the crosspoint 34 breaks down or fires and assumes a low resistance state. Thereafter, the multiples 32, 38 are electrically joined.

One characteristic of a four layer diode is that after it fires, it continues to remain in its low resistance state as long as current flows through it. However, if the current ceases to flow through it, it starves or switches "off" and returns to its high resistance state.

Another characteristic of a four layer diode is that it fires at a relatively low voltage (called "the rate effect") when the potential is applied across its terminals has a steep rising wave front and at a much higher voltage (called "the breakdown") when the applied potential has a slow rising wave front.

The above identified co-pending Porter application describes how these two characteristics of a four layer diode are used to provide a self-seeking, current controlled switching circuit which requires no in-network controls. That is, each vertical multiple has an R-C network connected thereto as shown at 47, for example. The next cascaded stage is also connected to the vertical multiple, as at 48, for example. The end-marking applied at access point 29 has a slow rising wave form so that a diode in multiple 32 fires at its full breakdown voltage. If no crosspoints have fired, all vertical multiples stand at an idle potential, and the one of the diodes that has the lowest firing characteristic fires first. For example, diode 49 may fire. Then the capacitor in network 47 charges, and the end-marking potential at access point 29 falls toward the (−) 18 volts of battery B1. The voltage on the capacitor in network 47 changes almost instantaneously after crosspoint 49 fires. Thus, the firing potential applied over wire 48 to the next cascaded stage in network 20 has a steep rising wave front. This way, the diodes may be made to fire at a lower rate effect potential in each succeeding cascaded stage of network 20 (FIG. 1).

When a firing potential appears at each cascaded stage, a diode fires, and current flows to the vertical multiple capacitor. If a switch path finds its way through the network, current flows over such path to hold all fired diodes "on." If the path does not find its way through the network 20 before the capacitors charge, current ceases to flow through the fired diodes which starve and switch "off." If the firing potential remains, another path then tries to find its way through the network. This way, the paths systematically search through the network on a self-seeking basis until a desired link-to-link connection is completed.

Figure 3:
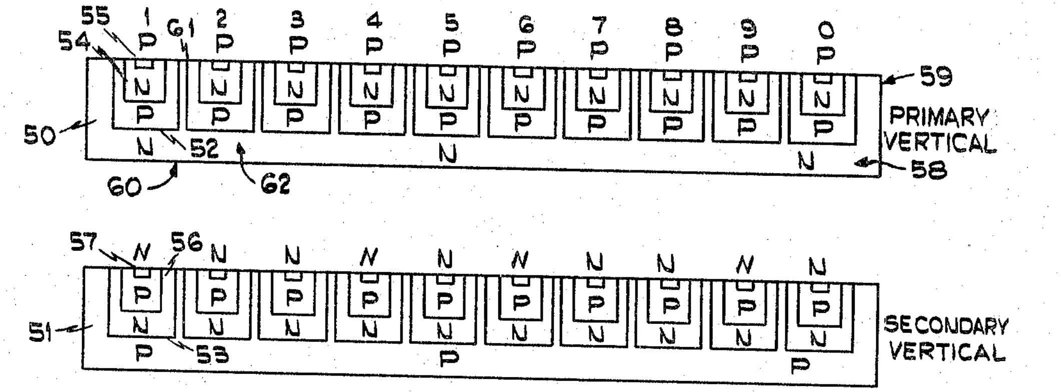
FIG. 3 shows a cross-sectional view of two strips of semiconductor material which form the integrated vertical multiples used in the invention to provide primary and secondary switches.

Recent developments in the semiconductor art have made it possible to provide integrated circuit substitution devices which may be used to eliminate much of the hand labor heretofore required to produce the network 20. FIG. 3 shows two integrated semiconductor devices which may be used as basic building blocks for assembling the switching network 20 of FIG. 1. Initially, each building block comprises an elongated wafer of semiconductor material. The wafer 50 used for the primary matrix is an "N" type material, and the wafer 51 used for the secondary matrix is a "P" type material. According to known techniques, the wafers are oxidized, coated with a photoresistant surface, and exposed through a negative to a light source. The negative comprises a plurality of windows formed in rows and columns. Then the wafer is etched, and a window is formed in the oxide layer to allow a diffusion of impurities into the semiconductor material. In the primary vertical material, these impurities formed rows and columns of islands of "P" material, each island being formed at a window in the oxide, as shown at 52, for example. In the secondary vertical, similar islands—but of "N" material—are diffused into the semiconductor material at the windows etched in the oxide, as shown at 53, for example. In a similar manner, other islands of impurity material are diffused into the wafer to provide alternate layers of "N" and "P" materials as shown at 54, 55, or "P" and "N" materials as shown at 56, 57. After all diodes are diffused into the semiconductor material, the wafer is scored between the rows of diodes. Then the wafer is caused to break apart along the scored lines and form itself into a plurality of semiconductor strips. For example, the wafer could be vibrated.

According to the invention, the diodes in the first cascaded stage of the network have electrical characteristics which make them less subject to disturbance by transients than the diodes in later cascaded ones of said matrices.

By inspection of FIG. 3, it is apparent that the strip 50 of semiconductor material, which is to be used as a primary vertical, is a series of four layer diodes formed in a single integrated wafer of semiconductor material. One side 58 of each of the diodes is a common section of the semiconductor material. The other side 59 of each of the diodes is individual to the individual ones of the diodes. For example, the side 55 is individual to the diode 60.

A plurality of barrier sections of semiconductor material are interposed between the individual diodes to prevent inter-diode migration of charge carriers within the block of semiconductor material. For example, a barrier 61 separates the diodes 60, 62. In like manner, the secondary vertical is a series of NPNP diodes separated by a plurality of barrier sections.

To increase the reliability of each vertical, a number of spare diodes are provided. Thus, if one network traffic pattern requires no more than seven diodes per vertical, ten diodes (for example) may be formed in each strip of material. This is because very little cost is required to include an additional diode in each strip. Therefore, in this particular example, three spare diodes are provided in each vertical to give added reliability through redundancy. This way, all diodes may be tested. If a defect is found, a non-defective diode may be substituted for it. Moreover, if a diode should burn out during operation, it is only necessary to substitute one of the spares.

Figure 4:
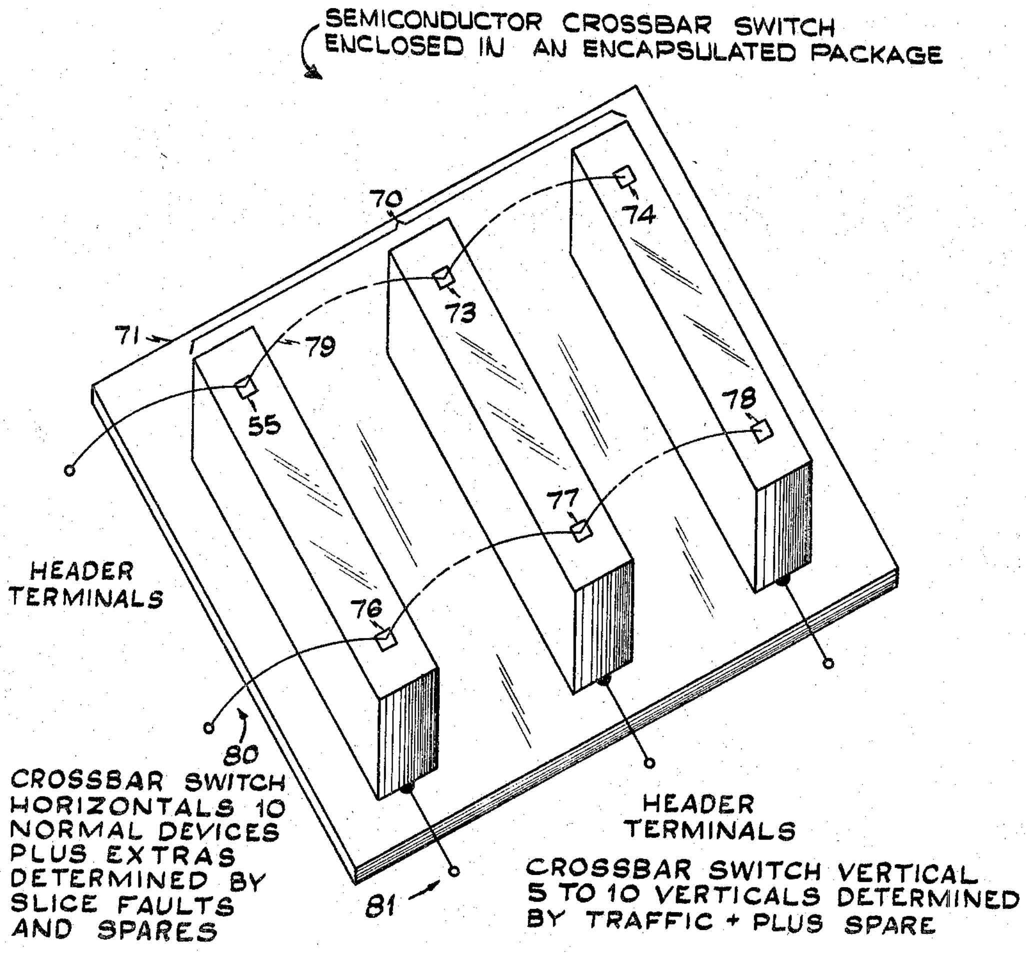
FIG. 4 shows in a three dimensional view how to couple a plurality of the semiconductor strips to provide a horizontal and vertical multiple arrangement.

An electronic switch for providing a crossbar type switching function is shown in FIG. 4. Here a plurality of strips 70 having the same construction are mounted in spaced, parallel relation on a support of any suitable type, such as a header 71. One characteristic of devices manufactured by the planar technique is that the semiconductor material does not have to be encapsulated; it is effectively sealed in oxide coating. The header 71 is primarily designed to give mechanical protection and support.

For convenience of expression, each of these strips 70 have herein been called "verticals." Thus, corresponding diodes in each strip are aligned and may be called "horizontals"; diodes 55, 73, 74 form one horizontal, and diodes 76, 77, 78 form another. Conductive material is applied across the individual sides of each diode in the corresponding positions (a horizontal multiple) on the strips of semiconductor material. For example, a conductor 79 joins the diodes 55, 73, 74 which form the first horizontal. Any convenient number of similar horizontal connections may be provided; with the strips of semiconductor material shown in FIG. 3, it may be convenient to provide seven used horizontals and three spare horizontals. The exact manner of applying the conductive material 79 is not important. The invention contemplates use of sputtering, chisel bonding, or vacuum deposition techniques.

Finally, a cover (not shown) may be applied to enclose and protect the semiconductor material. Leads are brought out from under the cover to make suitable connections to each horizontal and vertical multiple. For example, FIG. 4 shows five such leads. The leads 80 provide for making external connections to horizontal multiples, and the leads 81 provide for making external connections to the three vertical multiples.

Figure 5:
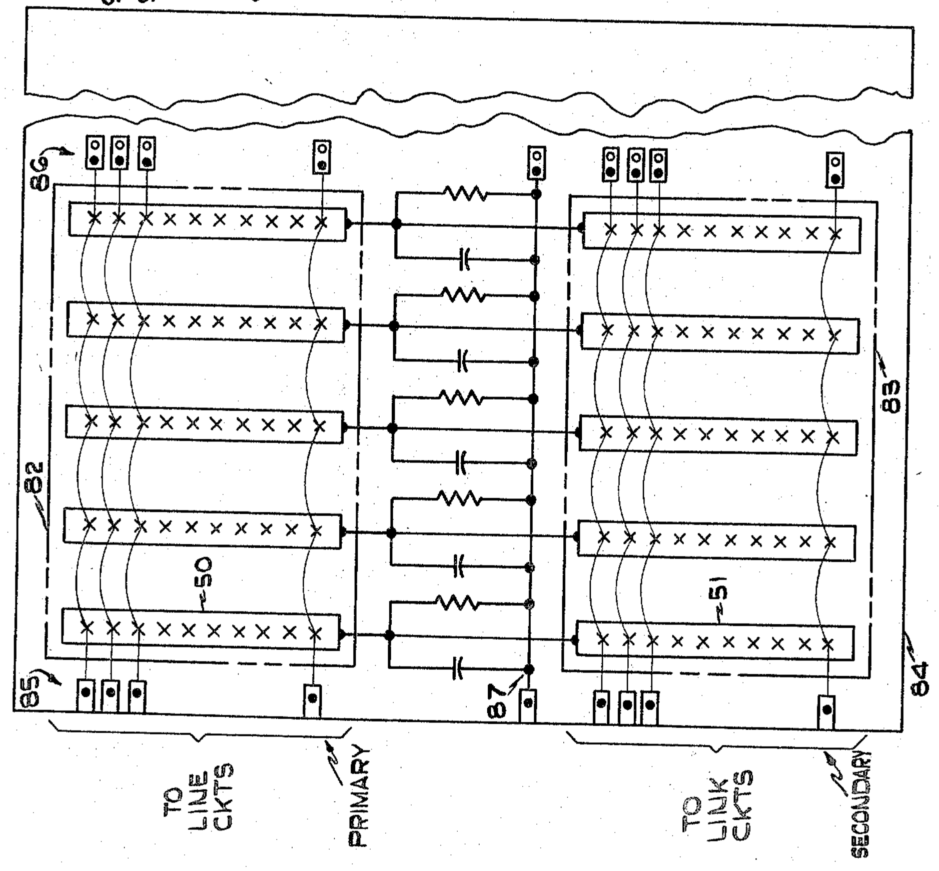
FIG. 5 shows how several of the arrangements of FIG. 4 are mounted on a single printed circuit card.

In FIG. 5, two exemplary electronic switches 82, 83 (constructed as shown in FIG. 4) are mounted on a single printed circuit card 84. If the electronic switch 82 is used as a primary matrix, the basic semiconductor material of each strip (50, for example) may be N-type material. If the electronic switch 83 is used as a secondary matrix, the basic material may be P-type material. Both electronic switches 82, 83 are connected, at one side, to the terminals 85 normally found on most printed circuit cards. At the other side, the switches may, if desired, connect to other terminals 86 for increasing the switching capacity on the printed circuit card. Thus, any convenient number of duplicates of switches 82, 83 may be attached to card 84 on the right-hand (as viewed in FIG. 5) side. This way the number of diodes in each horizontal multiple may be increased to fit any particular needs. Thus, the switch of FIG. 4 may be made small enough so that virtually no unused capacity is required. Also, the switches may be multiplied together to provide larger networks, as required.

As shown in FIG. 5, a first set of strips of diodes form the switch 82, and a second set of strips form the switch 83. Corresponding strips in these two sets are joined to form related pairs of strips. Thus, for example, the strips 50, 51 are a related pair. Four other related pairs are also shown in FIG. 5. A common bus 87 runs across the board to provide the bias required for the R-C networks connected to each related pair. Each of these networks performs the function described above in conjunction with network 47 of FIG. 2.

Figure 6:
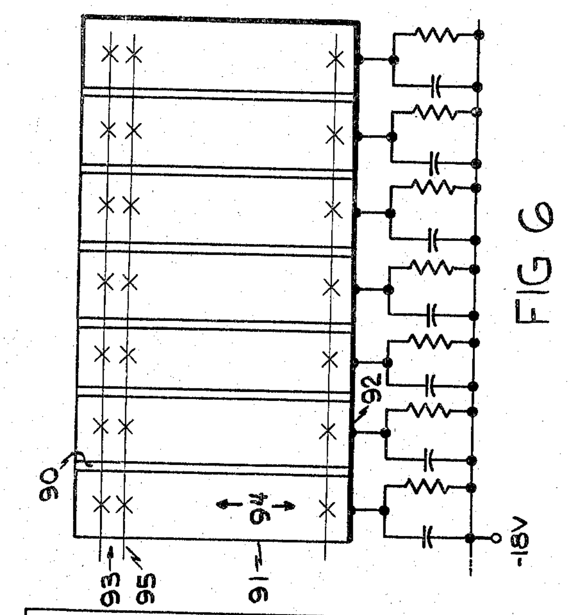
FIG. 6 shows a single block of semiconductor material formed into a completely integrated matrix.

In the embodiment of FIG. 6 the semiconductor wafer is not cut into strips. Instead, material 90 having a neutral or barrier characteristic is formed between each vertical strip of four layer diodes, such as strips 91, 92. In greater detail, each of these wafers is formed with rows 93 and columns 94 of four layer diodes (each diode crosspoint is here shown by a small "$x$"). Each column forms a strip of semiconductor material comprising a vertical constructed as taught in FIG. 3. Thus, strip 91 is a first vertical and strip 92 is a second vertical. Wires or conductive strips (such as 95) provide means for electrically joining all of the diodes in a given row which forms a horizontal. As before, there may be at least one spare row of diodes in each of said strips. Also, as before, the wafer 90 comprises a block of semiconductor material having a plurality of four layer diodes formed therein. One side of each of the diodes is a common section of the semiconductor material. The other side of each of the diodes is individual to the individual ones of the diodes. This time, however, the sections 90 of semiconductor material interposed between the diodes not only prevent inter-diode, but also inter-vertical migration of charge carriers within the block of semiconductor material.

Figure 7:
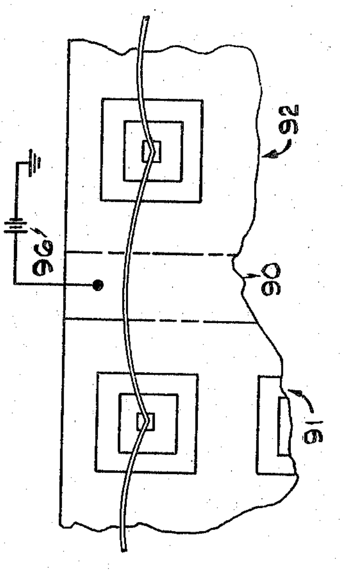
FIG. 7 shows how to bias the matrix of FIG. 6.

As shown in FIG. 7, the neutral sections 90 of the semiconductor material are biased by any suitable power source 96 to any convenient potential for preventing unwanted migration of charge carriers from any one diode to any adjacent diode.

While the principles of the invention have been described above in connection with specific apparatus and applications, it is to be understood that this description is made only by way of example and not as a limitation on the scope of the invention.

We claim:

1. An electronic switch comprising a plurality of strips of semiconductor material, each of said strips having a four layer diode sections formed therein, means for supporting said strips in spaced parallel relation to provide a first group of multiples, said diode sections being oriented to provide a second number of multiples, and means for electrically joining all of the diodes which comprise each of the second multiples.

2. The electronic switch of claim 1 wherein there are at least two separate sets of said strips providing said first multiples, one of said sets comprising a first cascaded matrix and the other of said sets comprising a second cascaded matrix, means for coupling together corresponding ones of said first multiples in each of said two sets to provide a related pair of first multiples, and a plurality of resistor-capacitor networks, there being one of said networks coupled to a corresponding junction between each related ones of a pair of said first multiples.

3. The electronic switch of claim 1 wherein one strip of semiconductor material in each related pair is made from N-type material having a series of planar sections of PNP material diffused therein to provide a series of PNPN diodes and the other strip in each related pair is made from P-type material having a series of planar sections of NPN material formed therein to provide a series of NPNP diodes.

4. An electronic switch comprising a block of semiconductor material having a plurality of four layer diodes arranged in groups therein, one side of each of said diodes being a common section of said semiconductor material, the other side of each of said diodes being individual to the individual ones of said diodes, means for electrically joining the individual sides of corresponding diodes of said groups, and a plurality of barrier sections of semiconductor material interposed between said diodes to prevent inter-diode migration of charge carriers in said block of semiconductor material.

5. The electronic switch of claim 4 wherein each block of said material comprises a wafer having rows and columns of four layer diodes formed therein, and means for electrically joining all of the diodes which forms each one of said rows, whereby a plurality of said columns are formed in a single one of said blocks.

6. The electronic switch of claim 5 and means for connecting a plurality of said blocks together to form a network of cascaded switching stages, and means whereby the diodes in the first cascaded one of said stages has electrical characteristics which are less disturbed by transients than the diodes in later cascaded ones of said stages.

7. The electronic switch of claim 5 wherein there are at least two of said wafers to provide two separate sets, said columns to form vertical multiples of a switching matrix, means for coupling together corresponding ones of said vertical multiples in each of said two sets to provide a related pair of verticals, and a plurality of resistor-capacitor networks, there being one of said networks coupled to a corresponding junction between each related one of a pair of vertical multiples.

8. The electronic switch of claim 7 wherein one vertical in each related pair is made from N-type material having a series of planar sections of PNP material diffused therein to provide a series of PNPN diodes and the other vertical in each related pair is made from P-type material having a series of planar sections of NPN material formed therein to provide a series of NPNP diodes.

9. The electronic switch of claim 4 wherein each block of said material comprises a column of four layer diodes formed as a strip of semiconductor material, means for electrically joining all of the corresponding diodes on each of a number of strips to form a plurality of rows of diodes, whereby each of said blocks forms an individual first multiple of said switch and each row forms an individual second multiple of said switch.

10. The electronic switch of claim 9 and means for connecting a plurality of said switches together to form a network of cascaded switching stages, and means whereby the diodes in the first cascaded one of said stages has electrical characteristics which are less disturbed by transients than the diodes in later cascaded ones of said stages.

11. The electronic switch of claim 9 wherein there are at least two sets of said strips arranged to provide vertical multiples of a switching matrix, means for coupling together corresponding ones of said vertical multiples in each of said two sets to provide a related pair of verticals, and a plurality of resistor-capacitor networks, there being one of said networks coupled to a corresponding junction between each related pair of vertical multiples.

12. The electronic switch of claim 11 wherein one vertical in each related pair is made from N-type material having a series of planar sections of PNP material diffused therein to provide a series of PNPN diodes and the other vertical in each related pair is made from P-type material having a series of planar sections of NPN material formed therein to provide a series of NPNP diodes.

No references cited.

NEIL C. READ, *Primary Examiner.*

H. I. PITTS, *Assistant Examiner.*